(12) United States Patent
Nguyen et al.

(10) Patent No.: US 7,375,443 B2
(45) Date of Patent: *May 20, 2008

(54) CPU SURGE REDUCTION AND PROTECTION

(75) Inventors: Don J. Nguyen, Portland, OR (US);
Alex Waizman, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 10/735,674

(22) Filed: Dec. 16, 2003

(65) Prior Publication Data

US 2004/0125531 A1 Jul. 1, 2004

Related U.S. Application Data

(63) Continuation-in-part of application No. 10/331,944, filed on Dec. 31, 2002.

(51) Int. Cl.
  *G05F 1/46* (2006.01)
  *H02J 1/00* (2006.01)
(52) U.S. Cl. ............................ 307/98; 307/52; 307/103
(58) Field of Classification Search .................. 307/52, 307/59, 98, 103
See application file for complete search history.

(56) References Cited

U.S. PATENT DOCUMENTS

| 6,188,209 B1 | 2/2001 | Poon et al. ................. 323/255 |
| 6,271,651 B1 | 8/2001 | Stratakos et al. ........... 323/282 |
| 6,285,175 B1 | 9/2001 | Massie ....................... 323/290 |

*Primary Examiner*—Michael Sherry
*Assistant Examiner*—Hal I Kaplan
(74) *Attorney, Agent, or Firm*—Blakely, Sokoloff, Taylor & Zafman LLP

(57) ABSTRACT

Methods and systems of providing power to a central processing unit (CPU) provide for enhanced surge protection during CPU current consumption going from high current to low current consumption. In one approach, a circuit as a power output stage with an output node, and a controller circuit coupled to the power output stage. The controller circuit selectively switches the power output stage into a current ramp down mode based on detection of a voltage surge at the output node. The power output stage has an associated current ramp down rate. The CPU is coupled to the output node and a surge notification input of the power output stage, where the power output stage accelerates the current ramp down based on a notification signal from the CPU for a duration proportional to the change in CPU current consumption from high to low current consumption.

25 Claims, 5 Drawing Sheets

CPU SURGE REDUCTION AND PROTECTION

CROSS REFERENCE TO RELATED APPLICATIONS

The present application is a continuation-in-part of U.S. patent application Ser. No. 10/331,944, filed on Dec. 31, 2002.

BACKGROUND

1. Technical Field

Embodiments of the present invention generally relate to the delivery of power to computer processors. More particularly, embodiments relate to the protection of computer processors from voltage surges when the processor changes its current consumption from high current to low current.

2. Discussion

Mobile computing platforms such as laptop computers, or "notebook" computers, have become an integral part of modem society, and continue to grow in popularity. While the trend toward longer battery life, smaller platform size, and enhanced functionality is desirable to the consumer, it presents significant challenges to computer designers as well as manufacturers. A particular area of concern relates to the delivery of power to the central processing unit (CPU) of a mobile computing platform.

The battery life of a notebook computer is quantified as the ratio between the battery capacity and the average platform power consumption. Thus, reducing average platform power consumption increases the battery life and enhances the overall marketability of the mobile computing platform. As a result, an increasing amount of attention has been directed to developing techniques for reducing power consumption. It has been determined that portions of a typical CPU can be inactive for a relatively large percentage of the time, where applying the clock to these portions requires additional power. Typical approaches to reducing power consumption have therefore involved placing the CPU in a low-power state whenever practical by gating off the clock to unused portions of the CPU. Indeed, many notebook computer CPUs are designed with aggressive clock-gating technology.

When the unused portions of the CPU are gated off, the current demand by the CPU transitions from a relatively high value to a relatively low value, causing a condition commonly referred to as a high-to-low current consumption transient. Similarly, when the unused portions of the CPU are gated on, the current demand transitions from a relatively low value to a relatively high value, causing a condition commonly referred to as a low-to-high current consumption transient. The voltage that is supplied to the processor, however, should remain as constant as possible (staying within a tolerance window such as a ±7.5% for example) in order for the CPU to be able to function as designed. Unfortunately, the high-to-low current consumption transient tends to cause the processor voltage to surge and the low-to-high current consumption transient tends to cause the processor voltage to "droop". Furthermore, while the droop usually may result in CPU operation failure if the voltage drops below specified limit, the surge in processor voltage constitutes a reliability degradation risk to the CPU that may manifest itself in CPU failure only after some time of operation under repetitive surges.

FIG. 1 shows one possible implementation of a conventional approach to a circuit 10 that is used to regulate the voltage applied to a CPU 26 (i.e., $V_{cc}$), where the circuit 10 uses an hysteric type of switching regulator. During constant current consumption conditions of CPU 26, the voltage at output node 16 is compared to a reference voltage, which is set to the desired voltage level (e.g., 1V) provided by a reference voltage component such as a Zener diode, bandgap reference, etc. When the voltage at output node 16 is lower than the reference voltage by $-V_H$, a comparator 18 generates a logic high signal, causing metal oxide semiconductor field effect transistor (MOSFET) driver 30 to turn on a switching transistor ($Q_{sw}$) in the power output stage 14. When $Q_{sw}$ is on, current in the output inductor (L), ramps up. If the voltage at output 16 is greater than the reference voltage by $+V_H$, comparator 18 outputs a logic low signal, causing MOSFET driver 30 to turn off $Q_{sw}$ and turn on a synchronization transistor ($Q_{SYNC}$). When $Q_{SYNC}$ is on, the current through the output inductor ramps down toward zero amps from a peak value. It should be noted that voltage regulator 12 has been simplified for discussion purposes and that inductor current ramping is a well-known phenomenon, described with the following equations.

$$v(t) = L\frac{di(t)}{dt}. \qquad \text{Equation 1}$$

According to Equation 1 the inductor ramp up rate is:

$$\frac{di(t)}{dt} = \frac{V_{DC} - V_{CC}}{L} \qquad \text{Equation 2}$$

where $V_{DC}$ is the system voltage, and the inductor ramp down rate is:

$$\frac{di(t)}{dt} = \frac{V_{CC}}{L}. \qquad \text{Equation 3}$$

Since the system voltage (e.g., $V_{DC}$) is typically on the order of 8.4-21 volts, and therefore much greater than the processor voltage, there is a much higher voltage across the output inductor during the ramp up mode than during the ramp down mode. As a result, the current ramp up rate through the inductor is substantially faster than that of the ramp down rate. Since the ramp down rate is relatively slow, the voltage surge at the output node 16 is typically greater than the voltage droop associated with the ramp up mode. The voltage surge can be estimated as follows, where $V_{ESR}$ is the initial voltage at node 16 ($V_{ESR}$ is not shown in the figure), and $i_L$ is the current through inductor L.

$$v_{SURGE}(t) = \frac{1}{C}\int (i_L - I_{CPU})dt + V_{ESR}. \qquad \text{Equation 4}$$

Due to the tight space limitations associated with mobile computing platforms, a possible output decoupling that will minimize the space of the decoupling solution can achieved by using a multi-layer ceramic capacitors (MLCC) 22 connected to the output node 16, where MLCC 22 has a small form factor. Though in real application several MLCCs will be used to achieve the needed minimum total capacitance for simplicity FIG. 1 shows only one capacitor. The MLCC 22 has a relatively small equivalent series resistance (ESR), but unfortunately has a relatively low capacitance. It can be shown from Equation 4 that by using an MLCC 22 for output decoupling, $V_{ESR}$ can be quite negligible. Due to the low capacitance, however, the voltage surge for the MLCC 22 can be significantly larger because C appears in the denominator of Equation 4. FIG. 2 shows the estimated voltage surge for a conventional power output stage in plot 24, where a 200 nH output inductor is used. In the illustrated example, the voltage surge threshold ($V_{MAX}$) is exceeded due to the relatively slow ramp down rate.

One approach to reducing the voltage surge at the output node would be to reduce the inductance of the output inductor in order to increase the inductor ramp down current. There is a penalty to be paid, however, for such an approach. For example, as the inductance is reduced, there will be an increase in ripple current, which can cause an undesirably high output voltage ripple in addition to high magnetic loss in the inductor, which results in lower power-conversion efficiency. There is therefore a need to reduce the voltage surge associated with the current ramp down mode of a power output stage without negatively impacting output voltage ripple.

BRIEF DESCRIPTION OF THE DRAWINGS

The various advantages of the embodiments of the present invention will become apparent to one skilled in the art by reading the following specification and appended claims, and by referencing the following drawings, in which the same reference characters refer to the same parts throughout the specification, and in which:

DETAILED DESCRIPTION

Figure 3:
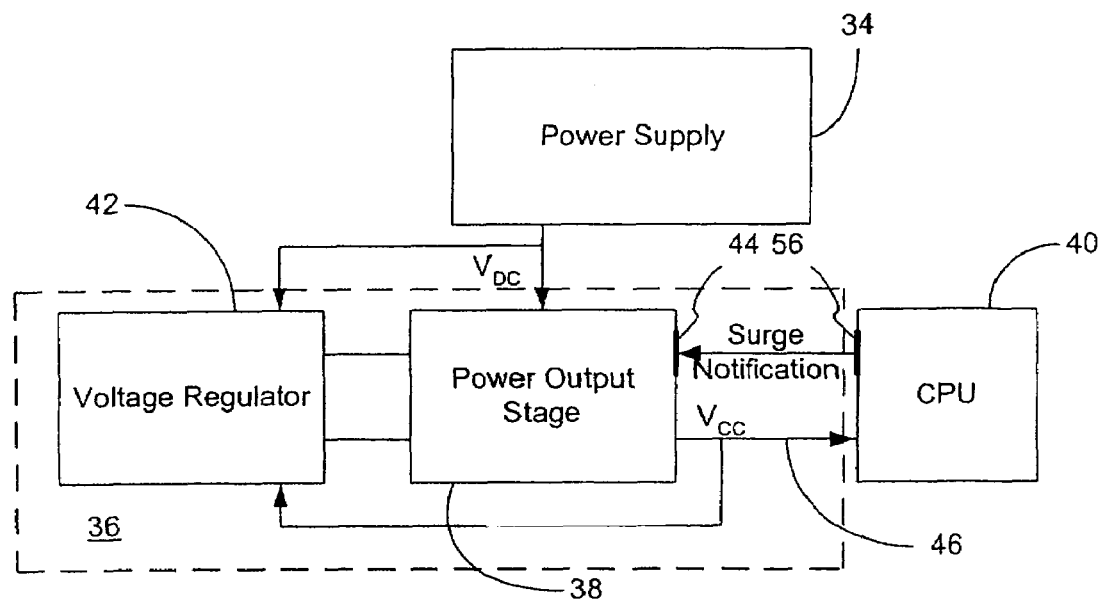
FIG. 3 is a block diagram of an example of a computer system having a circuit according to one embodiment of the invention.

FIG. 3 shows a computer system 32 having a power supply 34 and a circuit 36 containing a Controller Circuit 42 and Power Output Stage 38. The "CC" 42 can also be referred to as a switching voltage regulator. The computer system 32 can be part of a mobile computing platform such as a laptop computer. While the circuit 36 will be primarily described with regard to mobile computing platforms, embodiments of the invention are not so limited. Indeed, circuit 36 can be used in any environment in which voltage surge is an issue of concern. Notwithstanding, there are a number of aspects of mobile computing platforms for which circuit 36 is well suited.

The power supply 34 provides an unregulated input voltage ($V_{DC}$) while the circuit 36 converts the input voltage into a voltage level suitable for processor operation ($V_{CC}$). Usually the power supply 34 contains a conventional (frequently rechargeable) battery pack made up of a series of battery cells such as lithium ion battery cells or any other type of DC voltage source. In a typical case, the battery cells combine to provide a system voltage on the order of 18 volts with respect to ground but may vary depending on batteries charge level or operation with AC/DC adapter between any voltage level usually within the 8V to 21V range. The power supply 34 may also include an AC/DC adapter (not shown), which is capable of providing the system voltage while converting the regular 110V or 220V, 50 Hz or 60 Hz AC voltage into a DC voltage within the range above of 8V to 21V as a replacement to the battery cells. For the purposes of discussion, a range of 8-21V is used, although a larger (or smaller) range might be applicable as well.

The computer system 32 uses an improved circuit 36 to protect CPU 40 from voltage surges when CPU 40 is in current ramp down mode. Specifically, circuit 36 has a power output stage 38 and a CC, or switching regulator, 42 coupled to the power output stage 38. The term "coupled" is used herein to include any type of connection, direct or indirect, and includes but is not limited to connections that are electrical, optical, electromagnetic, mechanical, or any combination thereof. The CPU 40 is coupled to the power output stage 38, where the power output stage 38 receives the system voltage and has an output node 46 ($V_{CC}$) that is the processor operating voltage. During normal operation, the CC 42 constantly monitors the voltage level at output node 46 ($V_{CC}$), repeatedly switching the power output stage 38 into a current ramp down or ramp up mode based on the voltage level at output node 46.

In one embodiment, the CPU 40 has a surge notification output 56, which is coupled to a surge notification input 44 of the power output stage 38, where the power output stage 38 accelerates a current ramp down rate. The current ramp down rate, which is associated with the current ramp down mode, is accelerated based on the notification signal from output 56 of the CPU 40. By accelerating the current ramp down rate in the presence of a switching CC 42, the power output stage 38 is able to reduce the negative effects of voltage surge without negatively impacting output voltage ripple. Although the above description illustrates a single surge notification signal as an example that involves communication of only two binary states to the circuit 36, where the binary states indicate expected change in current consumption of the CPU 40 from high current to low current and vice versa, other approaches can be used without parting from the spirit and scope of the embodiments of the invention. For example, the concept is also expandable to various grades of current consumption changes in the CPU either up or down by making the surge notification signal a binary encoded signal, which is coupled between the CPU 40 and the circuit 36 on a several lines as two or more signals. For an example, the surge notification signal could be represented by two lines as 00 for minimal current, 01 for low current, 10 for medium high current and 11 for highest current consumption. Using more than two lines is also possible, which would allow further granularity in expected current consumption change to be communicated to the circuit 36. Furthermore the surge notification signal could be an analog signal voltage or current where the magnitude of the current or voltage signal would indicate the relative expected change in current consumption of the CPU 40.

Figure 1:
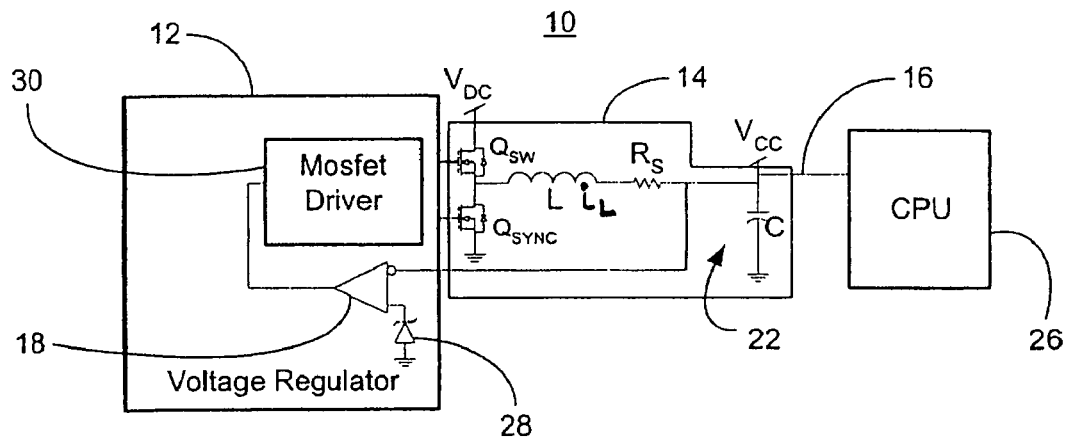
FIG. 1 is a circuit schematic of an example of a circuit having a conventional power output stage.
Figure 4A:
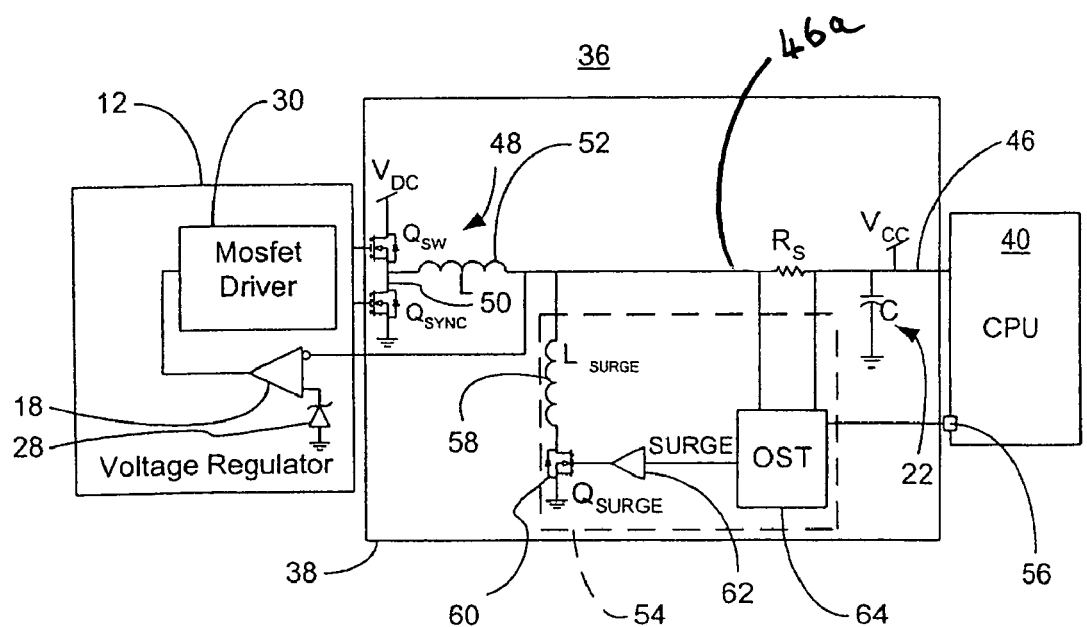
FIGS. 4A and 4B are schematic diagrams of examples of circuits having power output stages according to embodiments of the invention.
Figure 2:
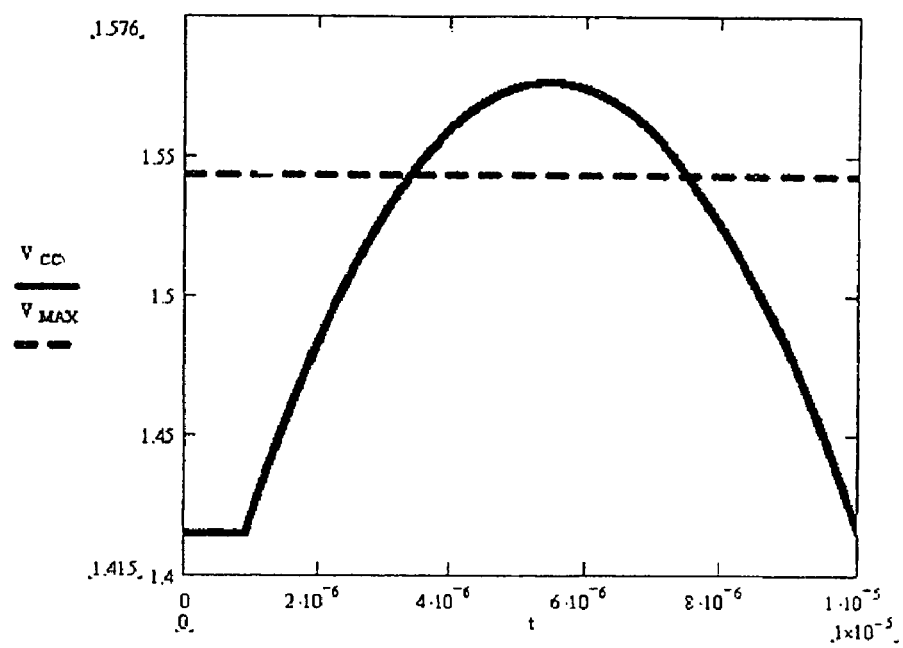
FIG. 2 is a plot of an example of a conventional voltage surge response curve.

Turning now to FIG. 4A, one approach to a circuit 36 is shown in greater detail. Since the power conversion efficiency of a voltage is critical in maintaining a low total platform power consumption to extend the platform's battery life, the voltage regulator of controller circuit 12 is designed to maximize its power-conversion efficiency to minimize power loss. Notebook computers use switching voltage regulators instead of linear-mode voltage regulators due to the much higher power-conversion efficiency. Generally, circuit 36 includes a controller circuit 12, which has a voltage comparator 18 that contains some amount of hysteresis $+/-V_H$. The circuit 36 also includes a power output stage 38 having an output node 46. $Q_{SW}$ of the output stage 38, when in the on-state, is used to apply $V_{DC}$ input power to the inductor L. This action causes the current in the inductor to ramp up, providing current to the CPU and the output capacitor 22. Once the output voltage $V_{CC}$ is high enough (e.g., slightly higher than that of the bandgap reference 28), the voltage comparator 18 outputs a logically low condition. In response to the low condition, a Mosfet Driver 30 drives the gate of $Q_{SW}$ low, turning it off. After a small delay such as approximately 10-50 nanoseconds, which is enough time for $Q_{SW}$ to go from an on-state to an off-state, the Mosfet Driver 30 drives the gate of $Q_{SYNC}$ high, turning it on. When $Q_{SYNC}$ is on, the inductor's current ramps down because its voltage is now reversed. As a result, the charge on the output capacitor 22 is depleted/discharged by the CPU 40. After a certain amount of time, when the potential on the capacitor 22 is discharged lower than that of the bandgap reference 28, the voltage comparator 18 changes its polarity from a low to a high condition. In response to the high condition, the Mosfet Driver 30 turns off $Q_{SYNC}$ and sequentially turns on $Q_{SW}$. This process repeats continuously at a certain frequency. This frequency is referred to as the operating frequency of the voltage regulator. Simply put, the CC 12 switches the power output stage 38 into a current ramp down mode based on detection of a voltage surge at the output node 46. Similarly, the CC 12 switches the power output stage 38 into a current ramp up mode based on detection of a voltage droop at the output node 46.

For CPU consumption currents above about 15-20A, a multi-phase (two phase or more) implementation of the circuit is provided. In this regard, multi-phase switching regulators are well documented. Though the circuit in FIG. 4A illustrates a single phase implementation of circuit 36 for simplicity, the concept is general and is expandable to multi phase operation of circuit 36 by including the circuit 54 for each phase and augmenting the circuits with logic gating that allows operation only of the circuit for the active phase. Specifically, a power output stage 38 has a transistor stack 48 containing transistors $Q_{SW}$ and $Q_{SYNC}$ coupled to the CC 12 and having a switching node 50. An output inductor 52 has a first terminal coupled to the switching node 50 of the transistor stack 48 and a second terminal coupled to the output node 46 through the series current sense resistor $R_S$ connected between nodes 46a and 46. The $Q_{SYNC}$, through output inductor 52, defines a ramp down current path when the power output stage 38 is in the current ramp down mode, and $Q_{SW}$ via output inductor 52 defines a ramp up current path when the power output stage 38 is in a current ramp up mode. The power output stage 38 also has a transient adjustment circuit 54 coupled to the output node 46a and a surge notification output 56 of the CPU 40. The transient adjustment circuit 54 reduces an effective inductance of the ramp down current path by effectively connecting to 0 v an $L_{SURGE}$ inductor 58 in parallel with the inductor 52 during ramp down operation in response to the surge notification signal from the CPU 40.

Thus, the illustrated transient adjustment circuit 54 has a surge inductor 58 with a first terminal coupled to the output node 46a, a surge transistor 60 coupled to a second terminal of the surge inductor 58 and the surge notification output 56 through one shot timer (OST) circuit 64 and driver 62. The surge transistor 60 switches the surge inductor 58 into a parallel connection with the output inductor 52 in response to the notification signal.

Figure 4B:
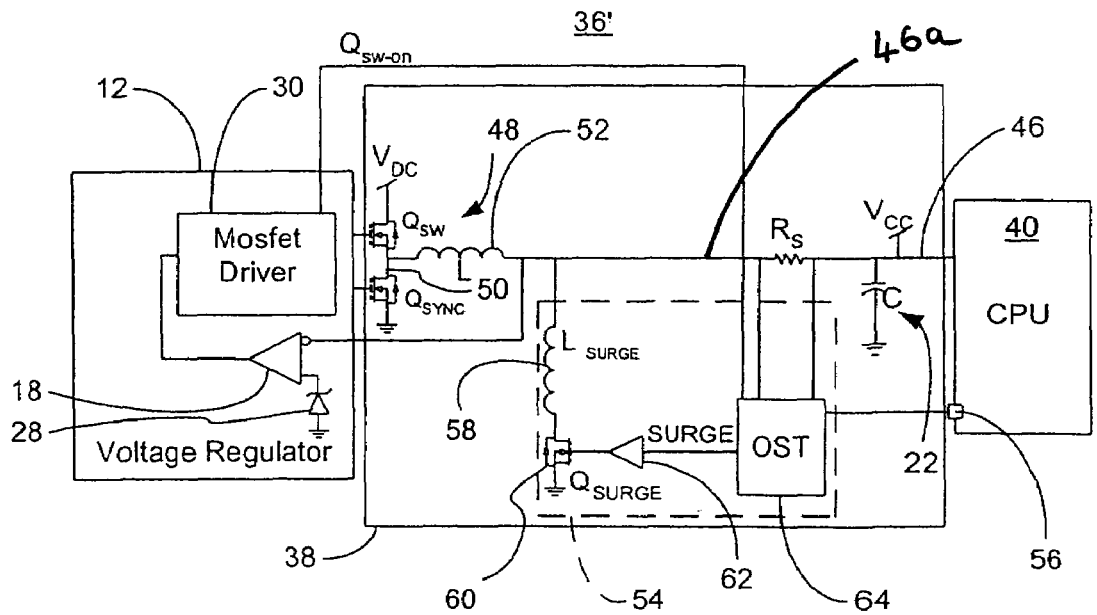

To avoid a potential $V_{DC}$ to GND short issue that may occur if $Q_{SURGE}$ is turned on while $Q_{SW}$ is also turned on, FIG. 4B illustrates a circuit 36' in which the OST 64 can receive the signal $Q_{SW-ON}$ from the Mosfet Driver 30 to ensure a break-before-make sequence.

With continuing reference to FIGS. 4A and 4B, it can be seen that by switching the surge inductor 58 into a parallel connection with the output inductor 52, the transient adjustment circuit 54 reduces the effective inductance of the ramp down current path of the power output stage 38'. The reduced effective inductance speeds up the rate at which the current supplied to the CPU 40 can decrease. As a result, the processor voltage is kept closer to its nominal value and the risk of damage to the CPU 40 is minimized.

In order to provide drive strength, the surge notification output 56 of the CPU 40 is coupled to the surge transistor 60 through a buffer 62. In addition, the second terminal of the output inductor 52 is coupled to the output node 46 through a sensing resistor (Rs). The OST 64 receives a level signal from the CPU 40 and converts the level signal into a pulse signal with controlled pulse width duration based on a ramp down current measurement obtained from the sensing resistor prior to surge notification signal activation. SURGE is a one-shoot signal, labeled as such in FIGS. 4A and 4B, that is generated by the OST block. It is logically-high long enough to reduce the surge voltage effect. The OST 64 can be implemented by using digital or analog design techniques using commercially available hardware or through integrated circuit design techniques.

Thus, the notification signal can be a pulse signal having a pulse width that corresponds to the amount of current that was stored in the output inductor 52 prior to surge notification signal 46 activation. If the current through the sensing resistor was relatively high, the width of the pulse signal programmed by OST 64 will be wider and the surge transistor 60 will switch the surge inductor 58 into the parallel connection for a longer period of time. Conversely, if the current through the sensing resistor was relatively low prior to surge notification signal activation, the width of the pulse signal programmed by OST 64 will be narrower and the surge transistor 60 will switch the surge inductor 58 into the parallel connection with the output inductor 52 for a shorter period of time. It should be noted that although the OST 64 is shown as being a component of the power output stage 38, the OST 64 may alternatively be incorporated into the CPU 40, or into the CC 12 without parting from the spirit and scope of the embodiments of the invention. Decoupling capacitor (C) 22 has a terminal coupled to the output node 46 and smoothes out the processor voltage according to conventional approaches.

Though the examples illustrated in FIGS. 4A and 4B show the inductors 52 and 58 as separate inductors for the purpose of simplicity of explanation, other approaches are possible. For example, the surge inductor 58 may occupy additional real estate on a mother board in which real estate is a very scarce resource, particularly for notebook computers. Since the surge inductor 58 strives to reduce the effective inductance during the surge event, an alternative implementation would be to add a third terminal to output inductor 52 in between the terminals 50 and 46a. In this case, surge transistor 60 would connect to the third terminal of output inductor 52 the same way as shown.

Figure 7:
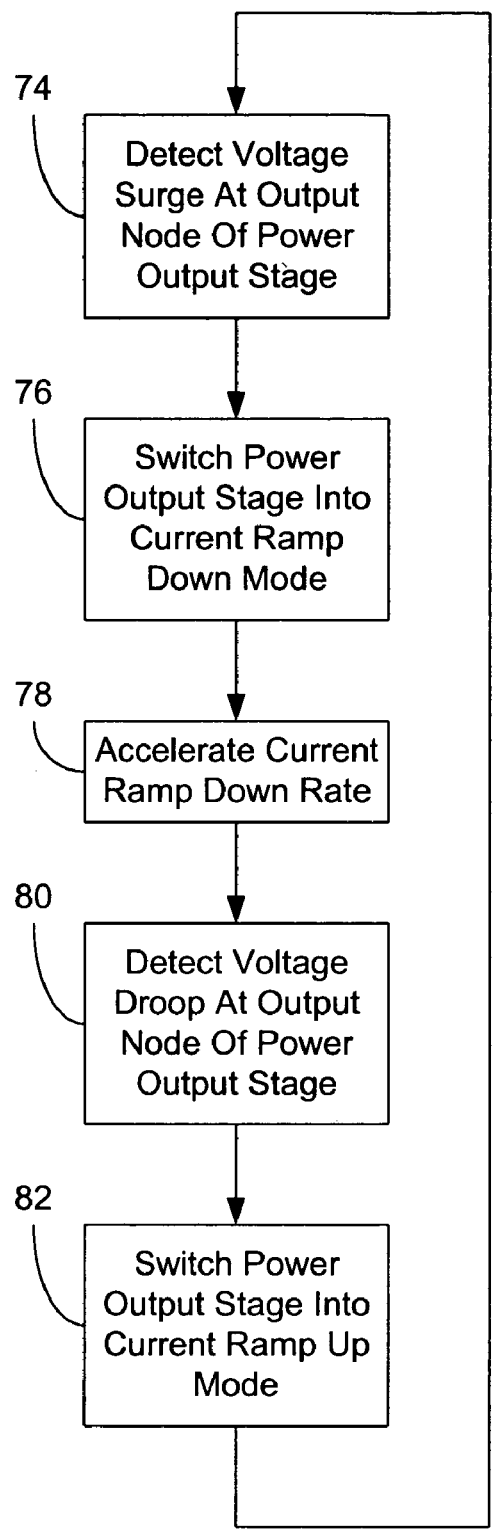
FIG. 7 is a flowchart to show an example of a method of protecting a processor from voltage surges.

Turning now to FIG. 7, a method 72 of protecting a processor from voltage surges is shown. Processing block 74 provides for detecting a voltage surge at an output node of a power output stage. The power output stage is switched into a current ramp down mode at block 76 based on the voltage surge, where the power output stage has an associated current ramp down rate. Block 78 provides for accelerating the current ramp down rate based on a surge notification signal from the processor. It can further be seen that a voltage droop at the output node is detected at block 80 and the power output stage is switched into a current ramp up mode at block 82 based on the voltage droop. Thus, the current ramping rate is adjusted for the current ramp down mode and does not have to be adjusted for the current ramp up mode. This is due to the difference in transients for the two modes. Specifically, there is a much higher voltage across the output inductor during the current ramp up mode than in the current ramp down mode. As a result, the current ramp up rate is substantially faster than that of the current ramp down rate.

Figure 6:
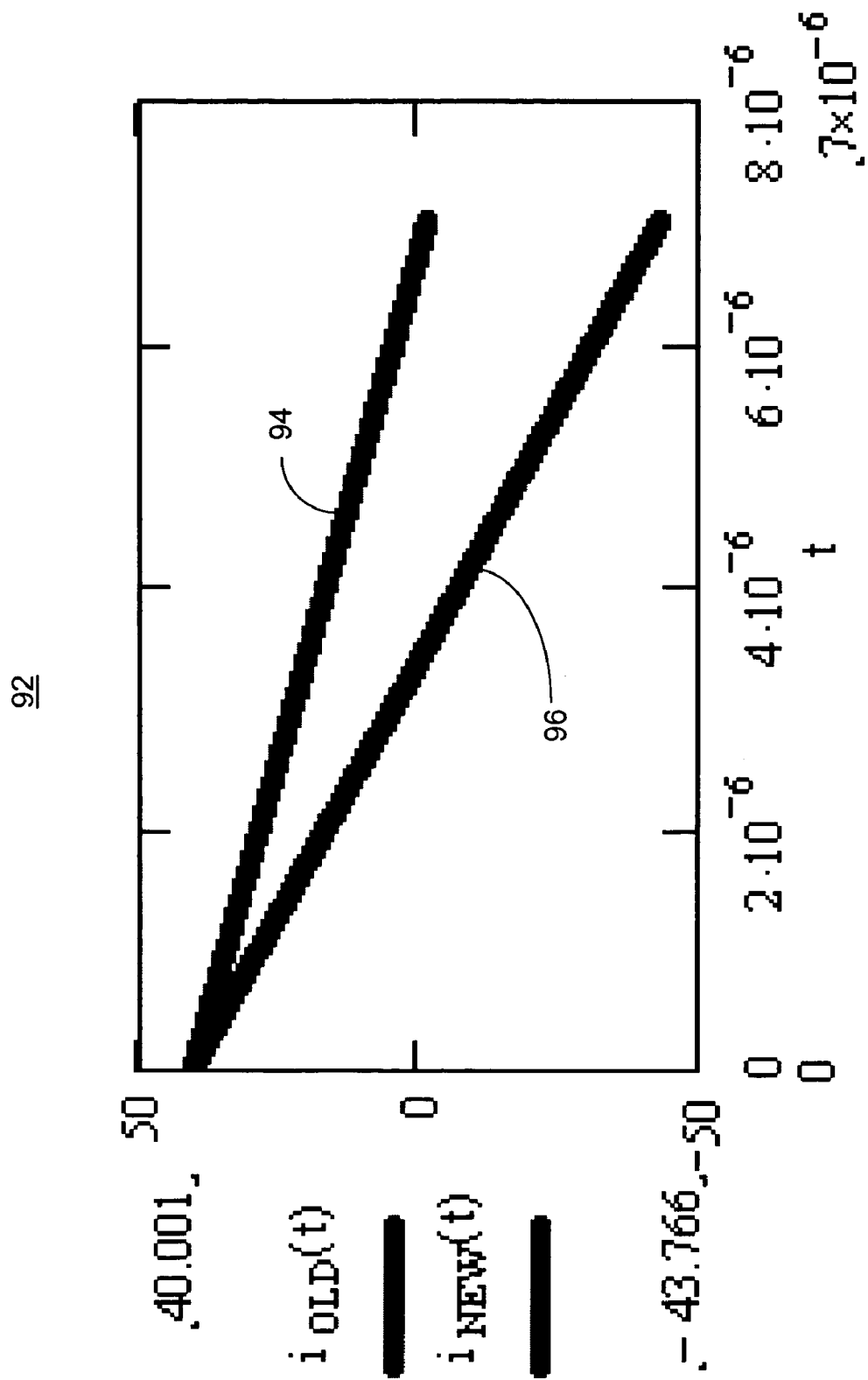
FIG. 6 is a graph of an example of a comparison between conventional ramp down and ramp down according to one embodiment of the invention.
Figure 8:
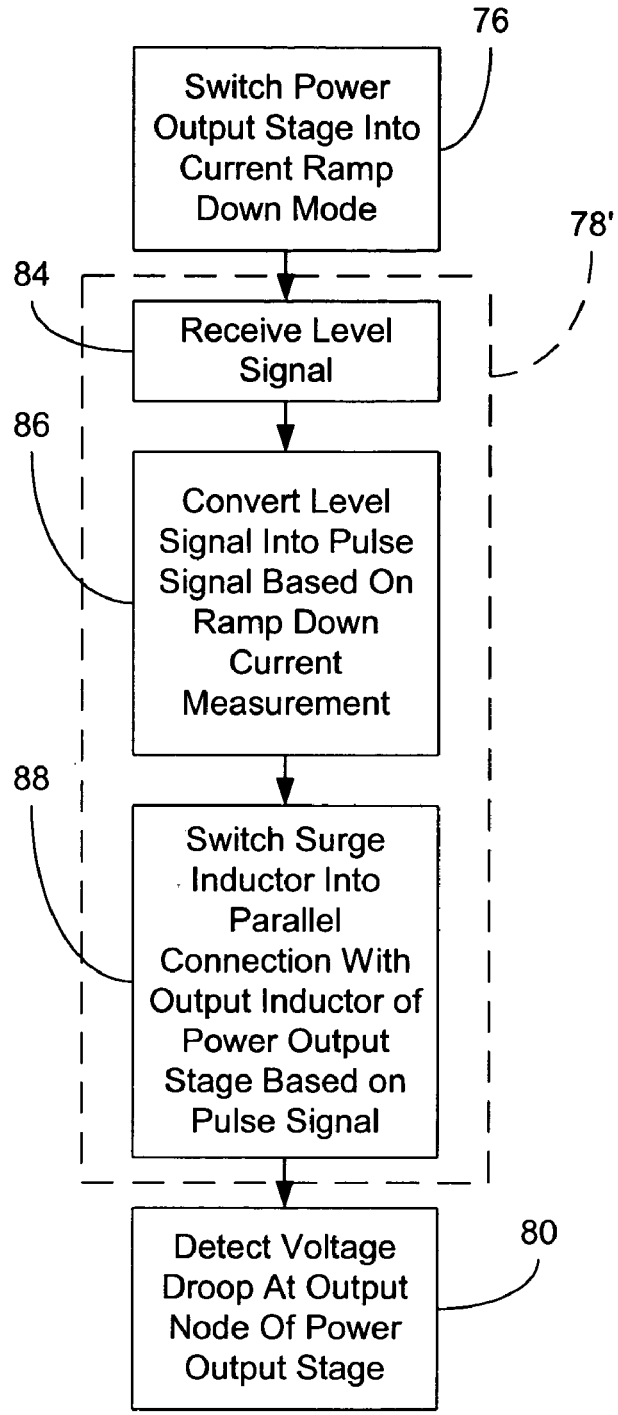
FIG. 8 is a flowchart to illustrate an example of an approach to accelerating a current ramp down rate.

One approach to accelerating the current ramp down rate is shown in greater detail at block 78' of FIG. 8. Specifically, block 84 provides for receiving a level signal, and block 86 provides for converting the level signal into a pulse signal based on a ramp down current measurement, which can be taken via the sensing resistor, $R_s$ (FIG. 4). The width of the pulse can be determined in other ways as well. A surge inductor is switched into a parallel connection with an output inductor of the power output stage at block 88 in order to reduce the effective inductance of the ramp down current path of the power output stage. This phenomenon is shown further in the plot 92 of FIG. 6 in which a conventional current ramp down curve 94 is compared to an accelerated current ramp down curve 96. As can be seen in FIG. 6, the new inductor current ramp down rate is much faster than that of the old inductor current plot. Due to the faster discharge rate, the output voltage surge is significantly reduced. As such, the output voltage stays within the allowable tolerance window or $V_{MAX}$.

Figure 5:
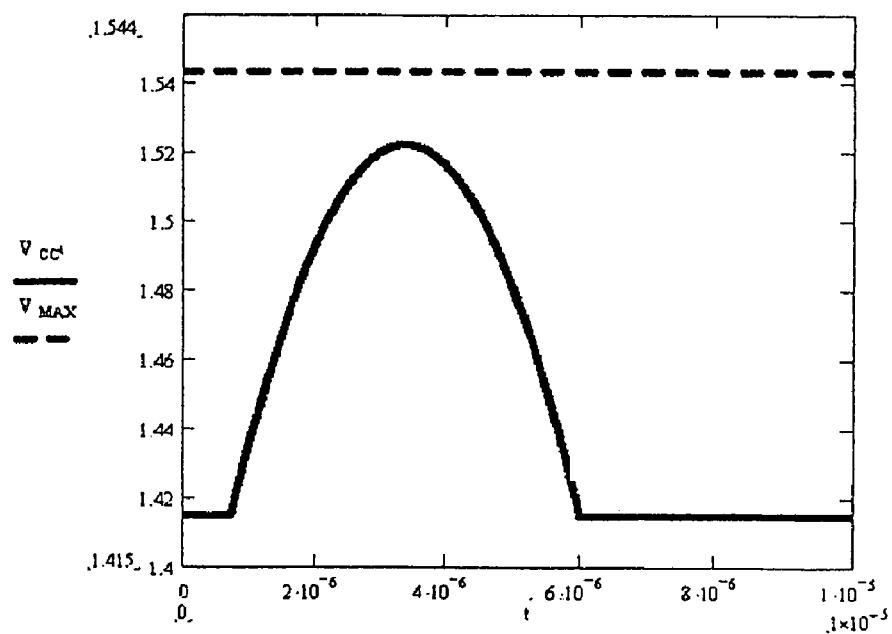
FIG. 5 is a plot of an example of voltage surge response curve according to one embodiment of the invention.

FIG. 5 shows the estimated voltage surge for a power output stage having a transient adjustment circuit in plot 90. In the illustrated example, the voltage surge threshold ($V_{max}$) is not exceeded due to the increased current ramp down rate.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. An integrated circuit comprising:
    a power output stage having an output node;
    a controller circuit coupled to the power output stage, the controller circuit to selectively switch the power output stage into a current ramp down mode based on detection of a voltage surge at the output node, the power output stage having an associated current ramp down rate; and
    a processor coupled to the output node and a surge notification input of the power output stage, the power output stage to accelerate the current ramp down rate based on a notification signal from the processor.

2. The integrated circuit of claim 1 wherein the power output stage includes:
    a transistor stack coupled to the controller circuit and having a switching node;
    an output inductor having a first terminal coupled to the switching node of the transistor stack and a second terminal coupled to the output node, the output inductor defining a ramp down current path of the power output stage; and
    a transient adjustment circuit coupled to the output node and a surge notification output of the processor, the transient adjustment circuit to reduce an effective inductance of the ramp down current path in response to the notification signal.

3. The integrated circuit of claim 2 wherein the transient adjustment circuit includes:
    a surge inductor having a first terminal coupled to the output node; and
    a surge transistor coupled to a second terminal of the surge inductor and the surge notification output, the surge transistor to switch the surge inductor into a parallel connection with the output inductor in response to the notification signal.

4. The integrated circuit of claim 3 wherein the surge notification output is coupled to the surge transistor through a buffer.

5. The integrated circuit of claim 2 wherein the second terminal of the output inductor is coupled to the output node through a sensing resistor.

6. The integrated circuit of claim 1 wherein the current ramp down mode is to correspond to a gating off of unused portions of the processor.

7. The integrated circuit of claim 1 wherein the notification signal is a pulse signal.

8. The integrated circuit of claim 7 further including a one shot timer coupled to the power output stage and the processor, the one shot timer to receive a level signal from the processor and convert the level signal into the pulse signal based on a ramp down current measurement.

9. The integrated circuit of claim 1 wherein the power output stage is to be coupled to a system voltage and the output node is to be coupled to a processor voltage, the system voltage to be greater than the processor voltage relative to a ground.

10. The integrated circuit of claim 1 further including an output capacitor having a terminal coupled to the output node.

11. The integrated circuit of claim 1 wherein the controller circuit is to switch the power output stage into a current ramp up mode based on a voltage droop at the output node.

12. The integrated circuit of claim 11 wherein the current ramp up mode is to correspond to a gating on of unused portions of the processor.

13. The integrated circuit of claim 11 wherein the controller circuit includes:
    a metal oxide semiconductor field effect transistor (MOSFET) driver coupled to the power output stage;

a comparator having a first input coupled to the output node and a comparator output coupled to the MOSFET driver; and a reference component to apply a reference voltage to a second input of the comparator.

14. The integrated circuit of claim 13 wherein the reference voltage component is a Zener diode.

15. A computer system comprising:

a power supply; and an integrated circuit, the integrated circuit including a power output stage, a controller circuit coupled to the power output stage, and a processor coupled to a surge notification input of the power output stage, the power output stage to receive a system voltage of the power supply and having an output node to receive a processor voltage of the power supply, the controller circuit to selectively switch the power output stage into a current ramp down mode based on a voltage surge at the output node, the power output stage having an associated current ramp down rate, the power output stage to accelerate the current ramp down rate based on a notification signal from the processor.

16. The computer system of claim 15 wherein the power output stage includes:

a transistor stack coupled to the controller circuit and having a switching node;

an output inductor having a first terminal coupled to the switching node of the transistor stack and a second terminal coupled to the output node, the output inductor defining a ramp down current path of the power output stage;

a transient adjustment circuit coupled to the output node, a ground of the power supply and a surge notification output of the processor, the transient adjustment circuit to reduce an effective inductance of the ramp down current path in response to the notification signal.

17. The computer system of claim 16 wherein the transient adjustment circuit includes:

a surge inductor having a first terminal coupled to the output node; and a surge transistor coupled to a second terminal of the surge inductor and the surge notification output, the surge transistor to switch the surge inductor into a parallel connection with the output inductor in response to the notification signal.

18. The computer system of claim 17 wherein the surge notification output is coupled to the surge transistor through a buffer.

19. The computer system of claim 16 wherein the second terminal of the output inductor is coupled to the output node through a sensing resistor.

20. The computer system of claim 15 wherein the current ramp down mode is to correspond to a gating off of unused portions of the processor.

21. The computer system of claim 15 wherein the notification signal is a pulse signal.

22. An integrated circuit comprising:

a power output stage, the power output stage including a transistor stack, an output inductor and a transient adjustment circuit, the transistor stack having a switching node, the output inductor defining a ramp down current path and having a first terminal coupled to the switching node and a second terminal coupled to an output node of the power output stage;

a controller circuit coupled to the power output stage, the controller circuit including a metal oxide semiconductor field effect transistor (MOSFET) driver, a comparator and a reference component, the MOSFET driver coupled to the transistor stack of the power output stage, the comparator having a first input coupled to the output node and a comparator output coupled to the MOSFET driver, the reference component to apply a reference voltage to a second input of the comparator; and a processor coupled to the output node and having a surge notification output coupled to a surge notification input of the transient adjustment circuit, the transient adjustment circuit to reduce an effective inductance of the ramp down current path in response to a surge notification signal from the processor, the notification signal to correspond to a gating off of unused portions of the processor.

23. The integrated circuit of claim 22 wherein the transient adjustment circuit includes:

a surge inductor having a first terminal coupled to the output node; and a surge transistor coupled to a second terminal of the surge inductor and the surge notification output, the surge transistor to switch the surge inductor into a parallel connection with the output inductor in response to the notification signal.

24. The integrated circuit of claim 23 wherein the surge notification output is coupled to the surge transistor through a buffer.

25. The integrated circuit of claim 22 further including an output capacitor having a terminal coupled to the output node.

* * * * *